United States Patent
Lee et al.

(10) Patent No.: US 10,005,551 B2
(45) Date of Patent: Jun. 26, 2018

(54) PASSIVE WIRELESS SENSORS FOR ROTARY MACHINES

(71) Applicant: General Electric Company, Schenectady, NY (US)

(72) Inventors: Yongjae Lee, Latham, NY (US); Joseph Alfred Iannotti, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 82 days.

(21) Appl. No.: 14/792,336

(22) Filed: Jul. 6, 2015

(65) Prior Publication Data
US 2017/0008623 A1    Jan. 12, 2017

(51) Int. Cl.
*B64C 27/32* (2006.01)
*G01H 1/00* (2006.01)
(Continued)

(52) U.S. Cl.
CPC .............. *B64C 27/32* (2013.01); *B64D 45/00* (2013.01); *G01H 1/003* (2013.01); *H01Q 1/28* (2013.01);
(Continued)

(58) Field of Classification Search
CPC ........ H04B 5/0056; H01Q 1/28; G01H 1/003; B64D 2045/0085; H04Q 2209/47
See application file for complete search history.

(56) References Cited

U.S. PATENT DOCUMENTS

| | | | |
|---|---|---|---|
| 5,192,923 A * | 3/1993 | Komatsu | H01P 1/068 333/116 |
| 5,892,411 A * | 4/1999 | Schwan | H04B 5/00 333/24 C |

(Continued)

FOREIGN PATENT DOCUMENTS

| | | |
|---|---|---|
| EP | 1994386 B1 | 12/2009 |
| GB | 2328086 | 2/1999 |

(Continued)

OTHER PUBLICATIONS

European Search Report and Written Opinion issued in connection with corresponding EP Application No. 16177630.7-1855 dated Nov. 24, 2016.

(Continued)

*Primary Examiner* — Brian M O'Hara
*Assistant Examiner* — Keith L Dixon
(74) *Attorney, Agent, or Firm* — GE Global Patent Operation; Nitin Joshi (57) ABSTRACT

A rotary machine includes a rotatable shaft and a retaining ring coupled to, and at least partially extending about, the rotatable shaft. The rotatable shaft defines a longitudinal axis. The rotatable shaft and the retaining ring define an annular cavity. The rotatable shaft and the retaining ring each include a radially outer surface. The rotary machine also includes a monitoring system including a stationary reader-antenna positioned proximate the retaining ring and a radio frequency (RF) coupler. The RF coupler includes at least one flexible antenna band coupled to, and extending over, the radially outer surface of the retaining ring. The flexible antenna band is configured to establish RF coupling with the stationary reader-antenna. A sensor die is coupled to the flexible antenna band. The sensor die extends into the (Continued)

substantially annular cavity and the sensor die is also coupled to the radially outer surface of the rotatable shaft.

12 Claims, 9 Drawing Sheets

(51) Int. Cl.
*H04Q 9/00* (2006.01)
*B64D 45/00* (2006.01)
*H01Q 1/28* (2006.01)
*H04B 5/00* (2006.01)

(52) U.S. Cl.
CPC ............ *H04B 5/0056* (2013.01); *H04Q 9/00* (2013.01); *B64D 2045/0085* (2013.01); *H04Q 2209/47* (2013.01); *H04Q 2209/88* (2013.01)

(56) References Cited

U.S. PATENT DOCUMENTS

| | | | |
|---|---|---|---|
| 6,478,584 B2 | 11/2002 | Vile et al. | |
| 6,838,958 B2 * | 1/2005 | Lonsdale | H01P 1/068 333/116 |
| 6,864,759 B2 | 3/2005 | Lonsdale et al. | |
| 7,026,977 B2 | 4/2006 | Reindl | |
| 7,034,661 B2 | 4/2006 | Lonsdale et al. | |
| 7,202,589 B2 | 4/2007 | Kalinin et al. | |
| 7,515,021 B2 * | 4/2009 | Kalinin | H01P 1/066 333/24 R |
| 7,701,350 B2 | 4/2010 | Sakama et al. | |
| 7,782,159 B2 * | 8/2010 | Beckley | H01P 1/068 333/24 R |
| 8,146,443 B2 | 4/2012 | Ohta et al. | |
| 8,296,087 B2 | 10/2012 | Kalinin et al. | |
| 9,213,144 B2 * | 12/2015 | Jones | G02B 6/3604 |
| 2003/0156024 A1 | 8/2003 | Beckley | |
| 2005/0287386 A1 | 12/2005 | Sabol et al. | |
| 2007/0241890 A1 | 10/2007 | Yoshioka | |
| 2008/0272901 A1 | 11/2008 | Dixon et al. | |
| 2010/0226756 A1 | 9/2010 | Mitchell et al. | |
| 2014/0000386 A1 | 1/2014 | Malhan et al. | |
| 2014/0240184 A1 | 8/2014 | Andle | |

FOREIGN PATENT DOCUMENTS

| | | |
|---|---|---|
| GB | 2451861 | 2/2009 |
| JP | 2003188621 A | 7/2003 |
| JP | 2005291999 A | 10/2005 |
| JP | 2006220574 A | 8/2006 |
| JP | 2007093450 A | 4/2007 |
| JP | 2008117165 A | 5/2008 |
| JP | 2010520961 A | 6/2010 |
| JP | 2013077268 A | 4/2013 |
| JP | 2013158070 A | 8/2013 |
| WO | 199205402 A1 | 4/1992 |

OTHER PUBLICATIONS

Notice of Allowance issued in connection with corresponding JP Application No. 2016-129507 dated Aug. 1, 2017.

* cited by examiner

PASSIVE WIRELESS SENSORS FOR ROTARY MACHINES

BACKGROUND

The field of the disclosure relates generally to passive wireless sensors and, more particularly, to passive wireless sensors for rotary machines.

A helicopter is a rotary-wing aircraft that uses a system of power-driven rotor blades to generate lift and thrust that enables the helicopter to climb/descend and to move in a horizontal direction. The rotor blades are coupled to, and extend radially outward from, a rotatable shaft, i.e., a rotor shaft coupled to a rotary drive device. A pitch of each blade may be individually adjustable to vary the angle of attack and an amount of lift generated by each blade. In some known helicopters, a pilot is provided with a collective pitch control, which changes the pitch on all of the blades simultaneously and equally, and a cyclic pitch control, which constantly varies the pitch of the individual blades through each cycle of rotation. Moreover, varying the pitch of the rotating blades with the cyclic pitch control varies the torque and strain in the rotary shaft.

The rotational forces induced on the rotor shaft by the rotary drive device, coupled with the forces induced on the rotor shaft due to the blade pitch changes, are monitored to facilitate maintaining such induced forces under predetermined parameters. As such, many of these known helicopter rotor shafts include known sensing devices that are configured to withstand high rotational speeds, e.g., in excess of 25,000 revolutions per minute (rpm) and the stresses and strains associated with such high-velocity rotational effects for only a short period of time, i.e., 100 hours or less. Therefore, stress monitoring devices for such rotary shafts are required to be sturdily constructed and mounted to reduce a potential for in-flight failures and to extend their operational service life. For example, some of such known stress monitoring devices include hardware, such as ground planes and terminating resistors, that substantially increase the construction and maintenance costs of helicopters.

BRIEF DESCRIPTION

In one aspect, a monitoring system for a rotary machine is provided. The rotary machine includes a rotatable shaft and a retaining ring coupled to, and at least partially extending about, the rotatable shaft. The rotatable shaft defines a longitudinal axis extending therethrough. The rotatable shaft and the retaining ring define a substantially annular cavity therebetween. The rotatable shaft includes a radially outer surface and the retaining ring includes a radially outer surface. The monitoring system includes a stationary reader-antenna positioned proximate the retaining ring and a radio frequency (RF) coupler. The RF coupler includes at least one flexible antenna band coupled to, and extending over, the radially outer surface of the retaining ring. The at least one flexible antenna band is configured to establish RF coupling with the stationary reader-antenna. The RF coupler also includes at least one sensor die coupled to the at least one flexible antenna band. The at least one sensor die at least partially extends into the substantially annular cavity. The at least one sensor die is also coupled to the radially outer surface of the rotatable shaft.

In a further aspect, a rotary machine is provided. The rotary machine includes a rotatable shaft including a radially outer surface and a retaining ring coupled to, and at least partially extending about, the rotatable shaft. The rotatable shaft defines a longitudinal axis extending therethrough and the rotatable shaft and the retaining ring define a substantially annular cavity therebetween. The retaining ring includes a radially outer surface. The rotary machine also includes a monitoring system including a stationary reader-antenna positioned proximate the retaining ring and a radio frequency (RF) coupler. The RF coupler includes at least one flexible antenna band coupled to, and extending over, the radially outer surface of the retaining ring. The at least one flexible antenna band is configured to establish RF coupling with the stationary reader-antenna. The RF coupler also includes at least one sensor die coupled to the at least one flexible antenna band. The at least one sensor die at least partially extends into the substantially annular cavity. The at least one sensor die is also coupled to the radially outer surface of the rotatable shaft.

In another aspect, an aircraft is provided. The aircraft includes a fuselage and at least one rotor assembly coupled to the fuselage. The at least one rotor assembly includes a rotatable shaft including a radially outer surface. The at least one rotor assembly also includes a retaining ring coupled to, and at least partially extending about, the rotatable shaft. The rotatable shaft defines a longitudinal axis extending therethrough. The rotatable shaft and the retaining ring define a substantially annular cavity therebetween. The retaining ring includes a radially outer surface. The rotor assembly further includes a monitoring system including a stationary reader-antenna positioned proximate the retaining ring and a radio frequency (RF) coupler The RF coupler includes at least one flexible antenna band coupled to, and extending over, the radially outer surface of the retaining ring. The at least one flexible antenna band is configured to establish RF coupling with the stationary reader-antenna. The RF coupler also includes at least one sensor die coupled to the at least one flexible antenna band. The at least one sensor die at least partially extends into the substantially annular cavity. The at least one sensor die is also coupled to the radially outer surface of the rotatable shaft.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The passive sensors, the associated RF coupler, and the associated sensing and monitoring systems described herein facilitate extended operation in harsh environments. Specifically, the radio frequency (RF) coupler as described herein uses two flex antennas that extend about an outer circumference of at least a portion of a retaining ring that extends about a rotor shaft within a helicopter rotor assembly. More specifically, one of the two flex antennas is positioned proximate a first longitudinal end of the retaining ring and the second of the two rings is positioned proximate a second longitudinal end of the retaining ring opposite the first longitudinal end. Each flex antenna includes two arms extending in opposite directions, each from a common stationary surface acoustic wave (SAW) die coupled to both arms. The arms of each flex antenna are not directly electrically coupled to each other, thereby facilitating ease of assembly of the rotor assembly.

A first stationary SAW die folds around the first longitudinal end of the retaining ring such that the first stationary SAW die is positioned on the rotor shaft within an annular region defined between a radially outer portion of the rotor shaft and a radially inner portion of the retaining ring.

Similarly, a second stationary SAW die folds around the second longitudinal end of the retaining ring such that the second stationary SAW die is positioned on the rotor shaft within the same annular region. The first stationary SAW die is circumferentially positioned 180° from the second stationary SAW die within the annular region. The SAW devices are configured to measure torque and strain on the rotor shaft. However, the SAW devices may also be configured to measure other conditions, e.g., environmental, such as the local temperature, and operational, such as the rotational velocity of the rotor shaft. The use of two flex antennas facilitates redundancy in the harsh conditions created by the high-rotational velocities of the rotor shaft. Also, coupling the flexible antenna to the retaining ring facilitates mitigation of a disruption of operation of the helicopter by mitigating a potential for flexible antenna to uncouple from the retaining ring.

In one embodiment, each of the two flex antennas includes arms that do not fully extend about the circumference of the outer surface of the retaining ring. In another embodiment, each of the two arms meet 180° circumferentially opposite the associated stationary SAW die. In yet another embodiment, one of the arms extends over the other arm approximately half a lap, thereby facilitating a self-capacitive effect that increases the signal integrity of the RF signal transmitted from the RF coupler to a reader-antenna device, e.g., and without limitation, the quality of the signal. Moreover, the overlapping configuration of the two arms does not require a ground plane, as neither does any of the configurations described herein. Therefore, the materials associated with ground planes are eliminated from the assembly. Furthermore, termination resistors typically coupled to a ground connection to match an alternating current impedance to prevent RF signals from being reflected back from the ground connection, are also eliminated.

Such use of flex antennas facilitates ease and speed of manufacturing of helicopter rotor assemblies. The use of adhesives to couple the flex antennas to the retaining ring facilitates the RF coupler surviving the high-G forces induced on the rotor shaft through high-speed velocities of the rotor shaft, sometimes as high as, or greater than, 25,000 revolutions per minute (rpm) while maintaining a satisfactory RF coupling quality between the RF coupler and the reader-antenna device. Moreover, the configurations of the RF couplers as described herein facilitate reducing the mechanical instability of the RF couplers by effective securing thereof.

Figure 1:
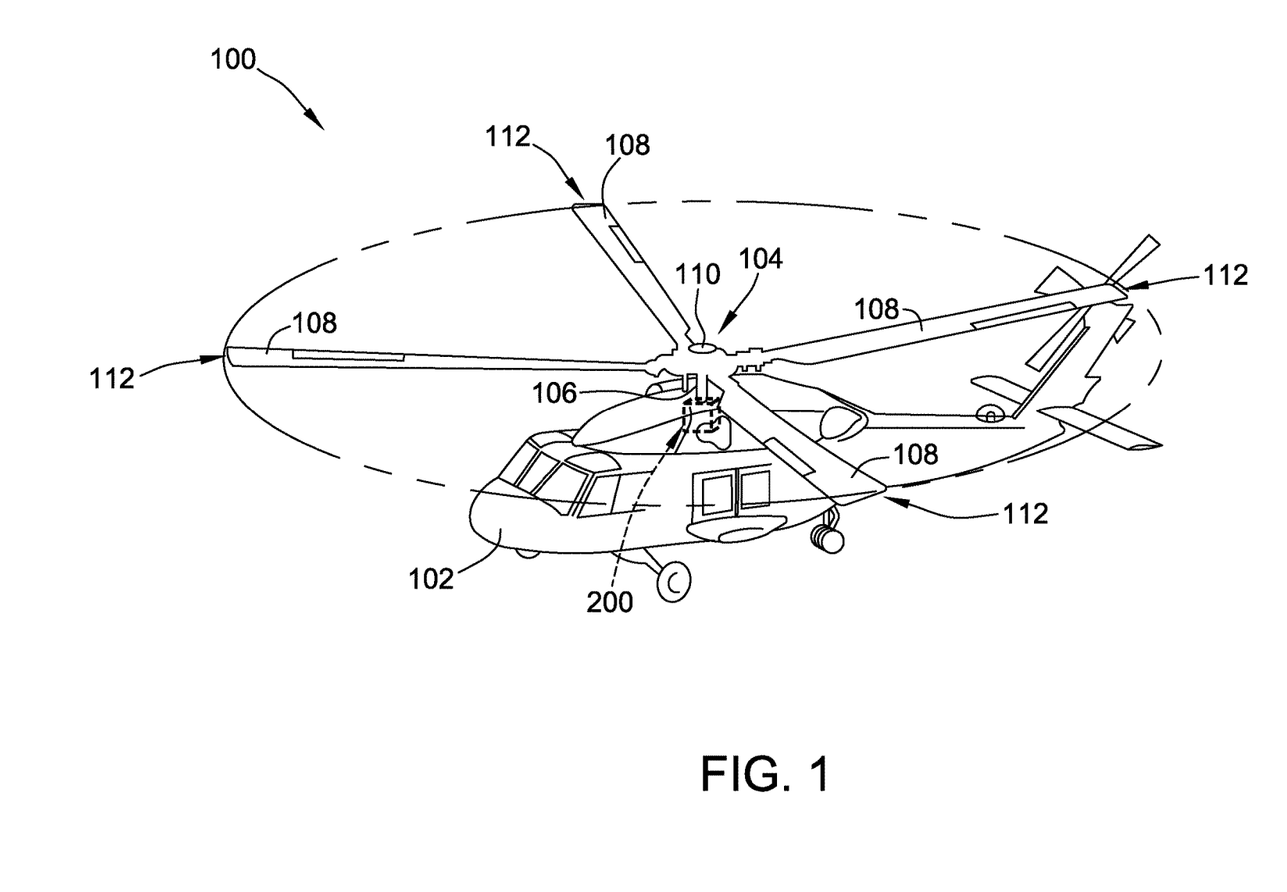
FIG. 1 is schematic perspective view of an exemplary helicopter including an exemplary rotor assembly mounted thereon with an exemplary monitoring system embedded therein.

FIG. 1 is schematic perspective view of an exemplary rotary machine 100, i.e., an aircraft, and specifically, a helicopter 100. Alternatively, rotary machine 100 is any machine that uses a rotary device, including, without limitation, those machines that generate rotary motion in one direction substantially continuously, e.g., and without limitation, air compressors (including those for gas turbine engines), high-speed drills, propeller driven airplanes, and wind turbines. Also, alternatively rotary machine 100 is any machine that generates reversing rotary motion, e.g., and without limitation, an electric clothes washer.

Helicopter 100 includes a fuselage 102 and a rotor assembly 104 coupled to fuselage 102. Rotor assembly 104 includes a rotatable shaft, i.e., a rotor shaft 106 and a plurality of rotor blades 108 that each extends from a central hub 110 outward to a rotor tip 112. Rotor assembly 104 also includes a monitoring system 200 embedded therein that facilitates sensing and monitoring of operational and environmental conditions within portions of rotor assembly 104 as described further below. In the exemplary embodiment, monitoring system 200 includes any processing device, computing device, and controller (not shown) embedding any computer program therein that enables operation of monitoring system 200 as described herein. Monitoring system 200 facilitates operation of rotor assembly 104 and helicopter 100 through recording real-time measurements of rotor shaft 106 and the local environment including, without limitation, torque and strain on rotor shaft 106, local temperature proximate rotor shaft 106, and rotational velocity and position of rotor shaft 106. Monitoring system 200 facilitates remote monitoring for, without limitation, a condition based maintenance system, a structural monitoring program, an operational control system for the machinery, an instrumentation schema, an engineering development verification, and a product verification.

Figure 2:
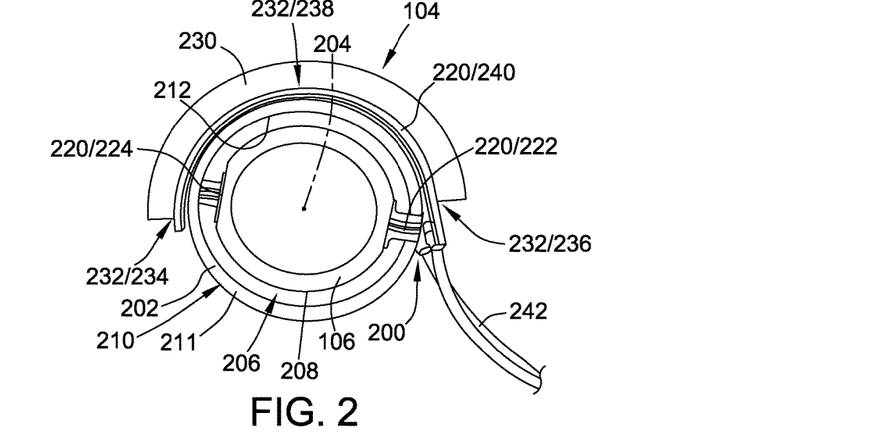
FIG. 2 is a schematic view of an exemplary portion of the rotor assembly and the monitoring system that may be used with the helicopter shown in FIG. 1.
Figures 3, 4:
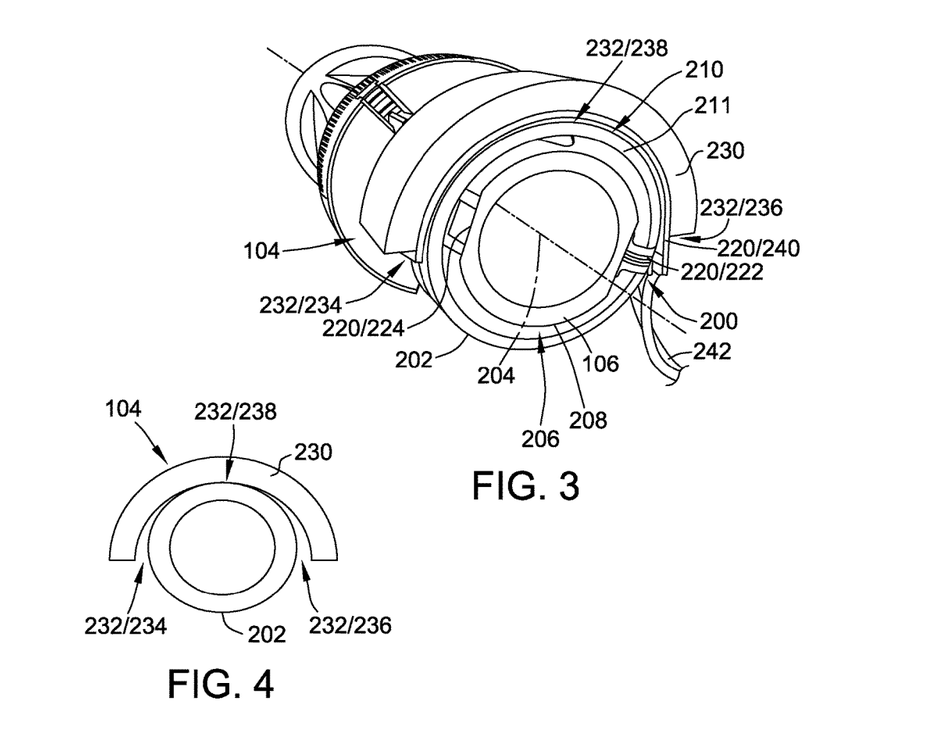
FIG. 3 is a schematic perspective view of the portion of the rotor assembly and the monitoring system shown in FIG. 2.
FIG. 4 is a schematic view of an exemplary configuration of a static bracket and a retaining ring that may be used with the rotor assembly and the monitoring system shown in FIGS. 2 and 3.

FIG. 2 is a schematic view of an exemplary portion of rotor assembly 104 and monitoring system 200 that may be used with helicopter 100 (shown in FIG. 1). FIG. 3 is a schematic perspective view of the portion of rotor assembly 104 and monitoring system 200 shown in FIG. 2. Rotor assembly 104 includes rotor shaft 106 and a retaining ring 202 at least partially extending, and in the exemplary embodiment, fully extending about rotor shaft 106. Rotor shaft 106 defines a longitudinal centerline axis 204 extending through rotor shaft 106. Retaining ring 202 and rotor shaft 106 define a substantially annular cavity 206 therebetween. Rotor shaft 106 includes a radially outer surface 208 and retaining ring 202 includes a radially outer surface 210 and a radially inner surface 212, where surfaces 210 and 212 are substantially equidistant from each other throughout cavity 206 defined therebetween. As such, retaining ring 202 and rotor shaft 106 are substantially concentric with each other about longitudinal axis 204. Also, retaining ring 202 includes a longitudinal surface 211 extending between radially outer surface 210 and radially inner surface 212 and concentrically extending about longitudinal axis 204. Moreover, retaining ring 202 and rotor shaft 106 are rotatably coupled through any mechanism that enables synchronized rotation of ring 202 with shaft 106, including, and without limitation, an interference fit of a dovetail joint and hardware fasteners.

Monitoring system 200 includes a radio frequency (RF) coupler 220 that includes at least one flexible antenna band 222 coupled to radially outer surface 210 of retaining ring 202. In the exemplary embodiment, flexible antenna band 222 is a first band and RF coupler 220 also includes a second flexible antenna band 224 coupled to radially outer surface 210. As such, first flexible antenna band 222 and second flexible antenna band 224 are substantially concentric about longitudinal axis 204. Radially outer surface 210 is flattened at receive the portions of first flexible antenna band 222 and second flexible antenna band 224 as described herein.

FIG. 4 is a schematic view of an exemplary configuration of a static bracket 230 and retaining ring 202. Static bracket 230 is coupled to fuselage 102 (shown in FIG. 1) through any means that enables operation of rotor assembly 104 and monitoring system 200 as described herein. Referring to FIGS. 2, 3, and 4, static bracket 230 partially extends about retaining ring 202 to define a passage 232 therebetween. An arcual configuration of static bracket 230 is such that passage 232 includes a first portion 234, a second portion 236, and a third portion 238. First portion 234 and second portion 236 of passage 232 are substantially identical with a decreasing distance between static bracket 230 and retaining ring 202 such that static bracket 230 and retaining ring 202 almost touch at third portion 238 of passage 232. First portion 234 and second portion 236 of passage 232 are shown somewhat exaggerated in FIG. 4 to show them more clearly. RF coupler 220 also includes a reader-antenna 240 (not shown in FIG. 4) configured to transmit signals to first flexible antenna band 222 and second flexible antenna band 224 through transmissions in the RF range of the frequency spectrum, thereby interrogating bands 222 and 224. Reader-antenna 240 is also configured to receive signals from first flexible antenna band 222 and second flexible antenna band 224 through transmissions in the RF range of the frequency spectrum, thereby reading bands 222 and 224. As such, reader-antenna 240 transmits energy to first flexible antenna band 222 and second flexible antenna band 224, where bands 222 and 224 are passively interrogated, and bands 222 and 224 passively transmit back to reader-antenna 240 any altered signals from a RF sensor die (not shown in FIG. 4) coupled to each of bands 222 and 224. Reader-antenna 240 is coupled to any power source and any processing device that enables operation of monitoring system 200 as described herein through conductors 242.

Figure 5:
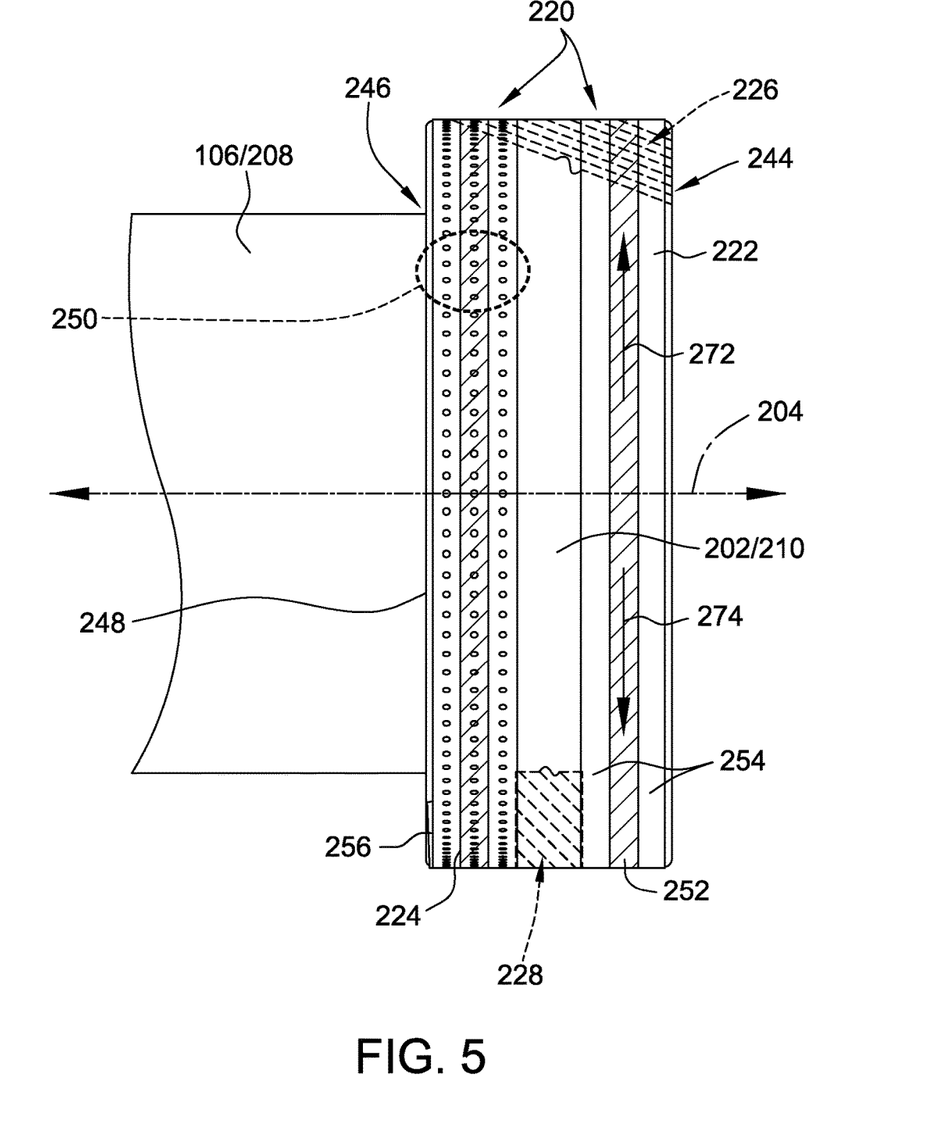
FIG. 5 is a schematic view of a portion of an exemplary radio frequency (RF) coupler that may be used with the monitoring system shown in FIGS. 1-4.
Figure 6:
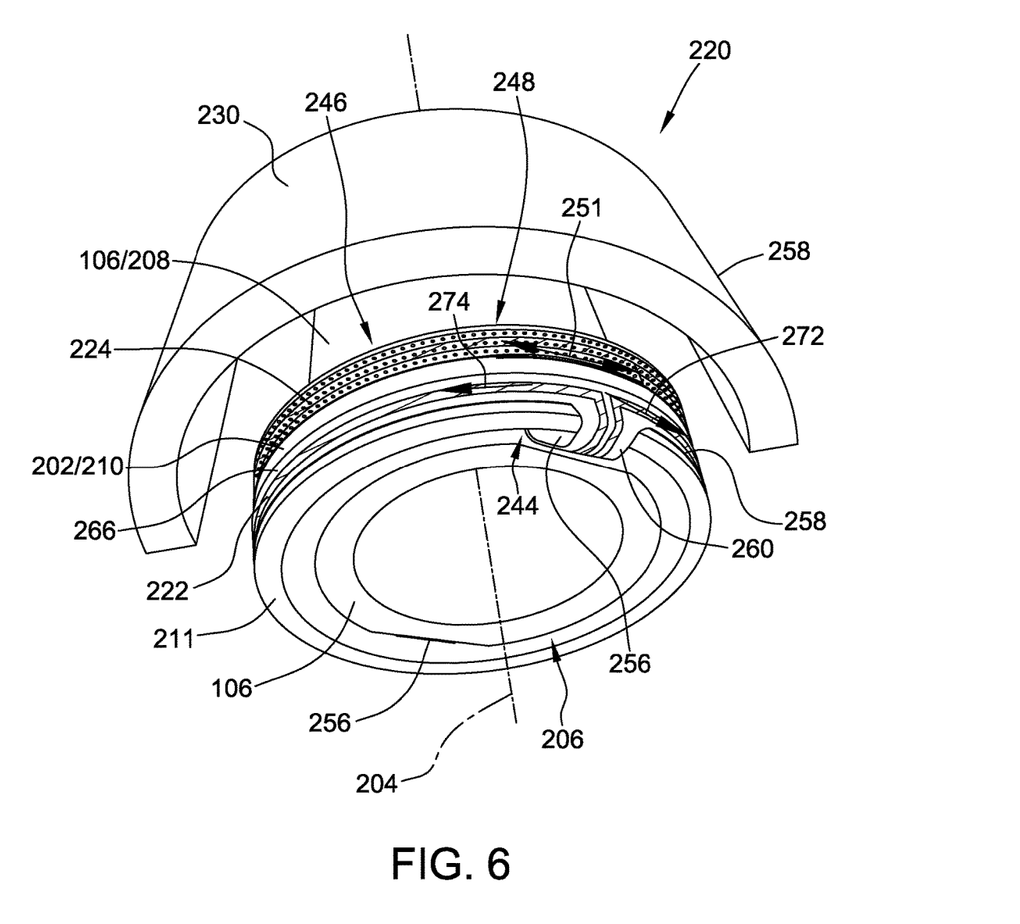
FIG. 6 is schematic perspective view of the portion of the RF coupler shown in FIG. 5.

FIG. 5 is schematic view of a portion of radio frequency (RF) coupler 220. FIG. 6 is schematic perspective view of the portion of RF coupler 220 shown in FIG. 5. In the exemplary embodiment, retaining ring 202 includes a first longitudinal end 244, that includes first longitudinal surface 211, and a second longitudinal end 246 that includes a second longitudinal surface 248 substantially similar to first longitudinal surface 211. First flexible antenna band 222 extends about, and is coupled to, radially outer surface 210 of retaining ring 202 proximate first longitudinal end 244 through use of any adhesive that enables operation of RF coupler 220 and monitoring system 200 as described herein. In the exemplary embodiment, first flexible antenna band 222 is substantially non-porous. Second flexible antenna band 224 also extends about, and is coupled to, radially outer surface 210 of retaining ring 202 proximate second longitudinal end 246 through use of any adhesive that enables operation of RF coupler 220 and monitoring system 200 as described herein. In contrast to first flexible antenna band 222, second flexible antenna band 224 includes a plurality of perforations 250 that facilitate improved adhesion of band 224 to surface 210.

In some embodiments, a heat shrink material 226 is positioned over first flexible antenna band 222, second flexible antenna band 224, and any remaining portions of radially outer surface 210. In the exemplary embodiment, heat shrink material 226 extends from first longitudinal end 244 to second longitudinal end 246. Alternatively, heat shrink material 226 extends over only a portion of first flexible antenna band 222 and/or second flexible antenna band 224. Heat shrink material 226 facilitates reducing a potential for first flexible antenna band 222 and second flexible antenna band 224 to uncouple from radially outer surface 210, especially at high-speed operation of rotor shaft 106. Further, in some embodiments, a bimetallic ring 228 is portioned over a portion of first flexible antenna band 222 and second flexible antenna band 224 separated by a portion of radially outer surface 210. Bimetallic ring 228 is positioned a predetermined distance from a center conductive portion 252 to reduce a potential for interfering with operation of bands 222 and 224 as described herein. Bimetallic ring 228 facilitates reducing a potential for portions of first flexible antenna band 222 and second flexible antenna band 224 proximate still exposed portions of radially outer surface 210 from curling and otherwise uncoupling from radially outer surface 210, especially at high-speed operation of rotor shaft 106. Moreover, in some embodiments, rather than bimetallic ring 228, a heat shrink metal band, or ring (not shown) similar in configuration to bimetallic ring 228 is used. Furthermore, in some embodiments, rather than heat shrink material 226, a fiber glass thread wrapping (not shown) is wrapped around first flexible antenna band 222, second flexible antenna band 224, and any remaining portions of radially outer surface 210 in a configuration similar to that for heat shrink material 226. The fiber glass thread wrapping is impregnated with an epoxy and cured to facilitate increasing the overall mechanical rigidity of RF coupler 220. Alternatively, any material in any configuration that enables operation of monitoring system 200 as described herein. In FIG. 6, an overlap region 251 of second flexible antenna band 224 is shown. Overlapping the flexible antenna bands is discussed further below.

Figure 7:
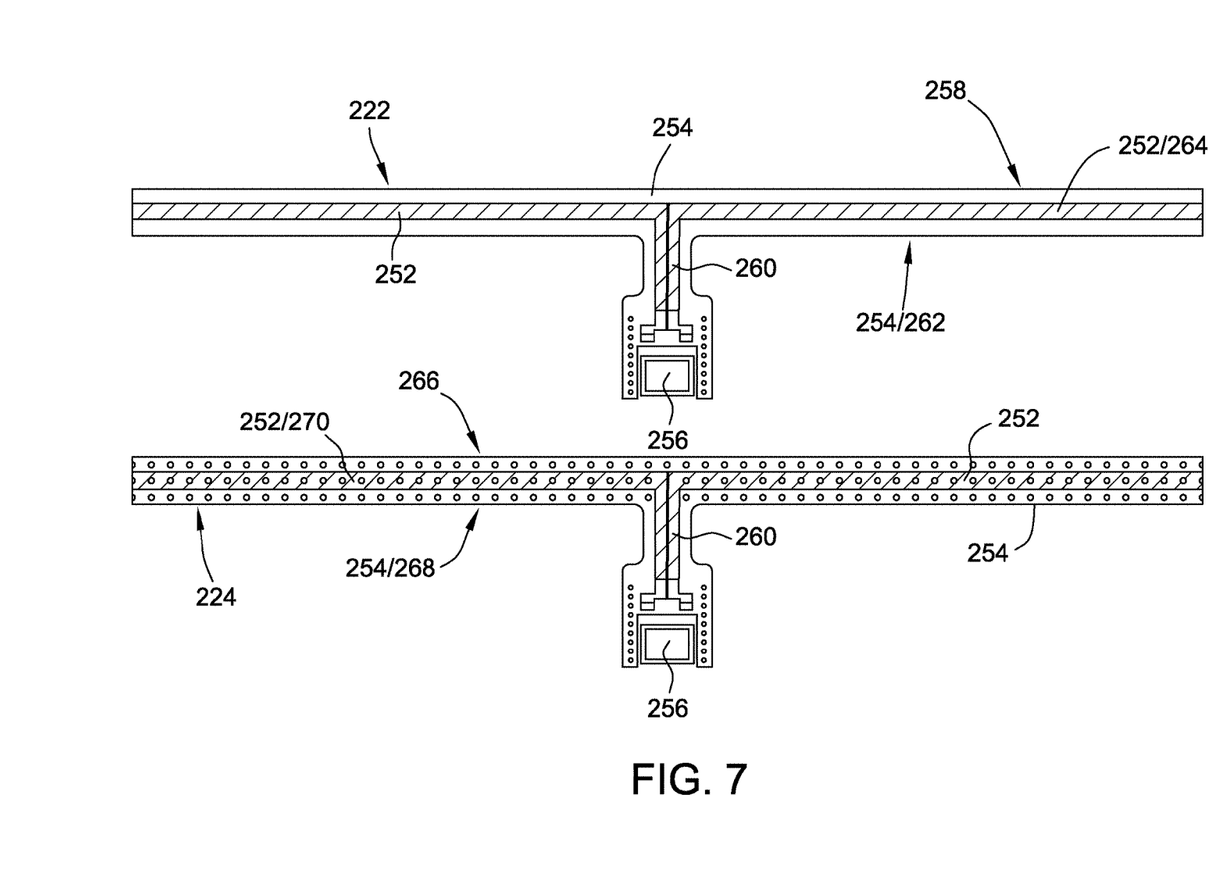
FIG. 7 is a schematic view of a pair of exemplary flexible antenna bands that may be used with the RF coupler shown in FIGS. 5 and 6 with the RF die shown in FIG. 8.

FIG. 7 is a schematic view of first flexible antenna band 222 and second flexible antenna band 224, where, in this exemplary embodiment, are substantially identical. Both first flexible antenna band 222 and second flexible antenna band 224 are configured to establish RF coupling with stationary reader-antenna 240 (shown in FIGS. 2 and 3). Also, both first flexible antenna band 222 and second flexible antenna band 224 include a center conductive portion 252 that is any conductive material that has sufficient electrical properties, including, without limitation, electrical conductivity and impedance, that enables operation of RF coupler 220 and monitoring system 200 as described herein, such materials including, e.g., and without limitation, copper. Also, both first flexible antenna band 222 and second flexible antenna band 224 include two outer non-conductive portions 254. In the exemplary embodiment, portions 254 are any non-conductive, flexible materials that enable operation of RF coupler 220 and monitoring system 200 as described herein, including, without limitation, a polyimide film, or laminate. In the exemplary embodiment, center conductive portion 252 is embedded within the flexible polyimide laminate.

Each of first flexible antenna band 222 and second flexible antenna band 224 include an RF sensor die 256. Also, each of bands 222 and 224 include a first arm 258 coupled to, and extending from, RF sensor die 256 through a connector strip 260. First arm 258 includes a first portion 262 of the flexible laminate and a first flexible voltage-inducing conductor 264 embedded therein. Further, each of bands 222 and 224 include a second arm 266 coupled to, and extending from, RF sensor die 256 through connector strip 260. Second arm 266 includes a second portion 268 of the flexible laminate and a second flexible voltage-inducing conductor 270 embedded therein.

Referring to FIGS. 5, 6, and 7, first arm 258 with first flexible voltage-inducing conductor 264 embedded therein extends from RF sensor die 256 in a clockwise direction 272 with respect to longitudinal axis 204. Similarly, second arm 266 with second flexible voltage-inducing conductor 268 embedded therein extends from RF sensor die 256 in a counterclockwise direction 274 with respect to longitudinal axis 204.

Also, in the exemplary embodiment, connector strip 260 for first flexible antenna band 222 is folded over first longitudinal surface 211 into cavity 206 proximate first longitudinal end 244 to couple RF sensor die 256 to radially outer surface 208 of rotor shaft 106 through a friction fit. Similarly, connector strip 260 for second flexible antenna band 224 is folded over second longitudinal surface 248 into cavity 206 proximate second longitudinal end 246 to couple RF sensor die 256 to radially outer surface 208 of rotor shaft 106 through a friction fit.

Figure 8:
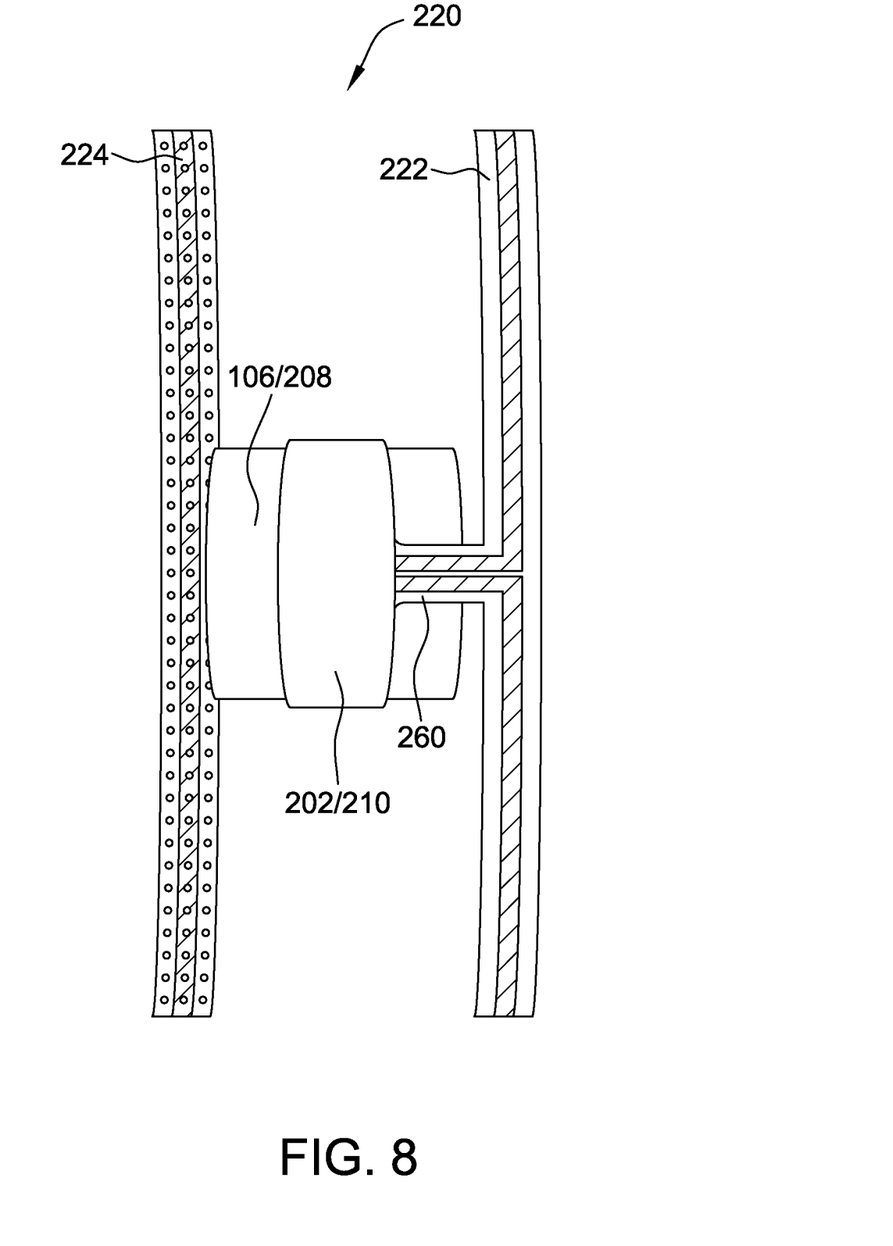
FIG. 8 is a schematic view of the pair of flexible antenna bands shown in FIG. 7 prior to coupling to the retaining ring shown in FIG. 4.
Figure 9:
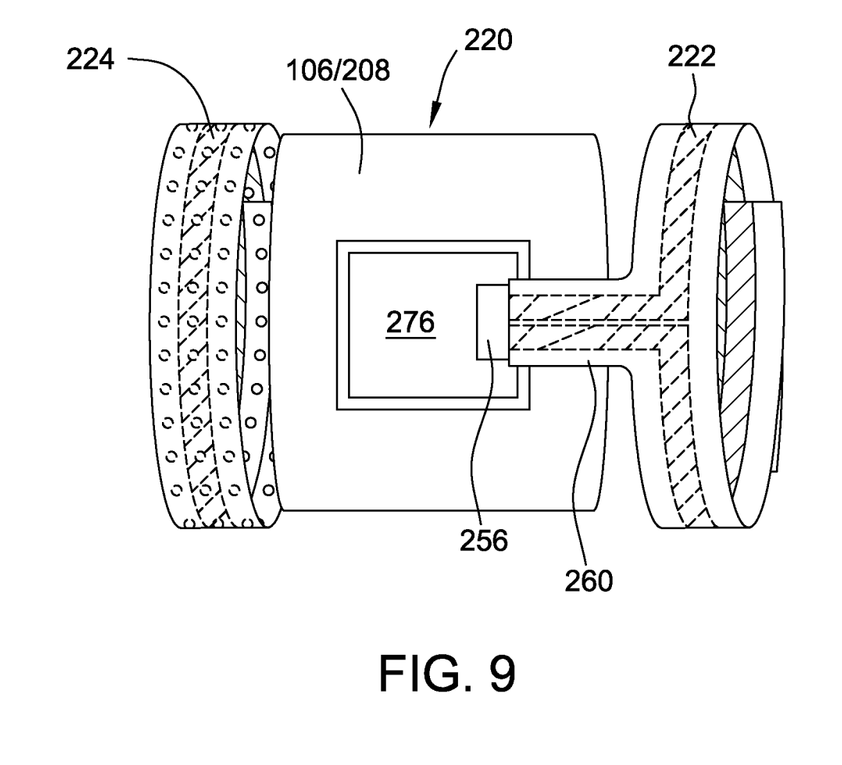
FIG. 9 is a schematic view of the pair of flexible antenna bands shown in FIGS. 7 and 8 prior to coupling to the retaining ring shown in FIG. 4 shown in reference to an exemplary rotor shaft.
Figure 10:
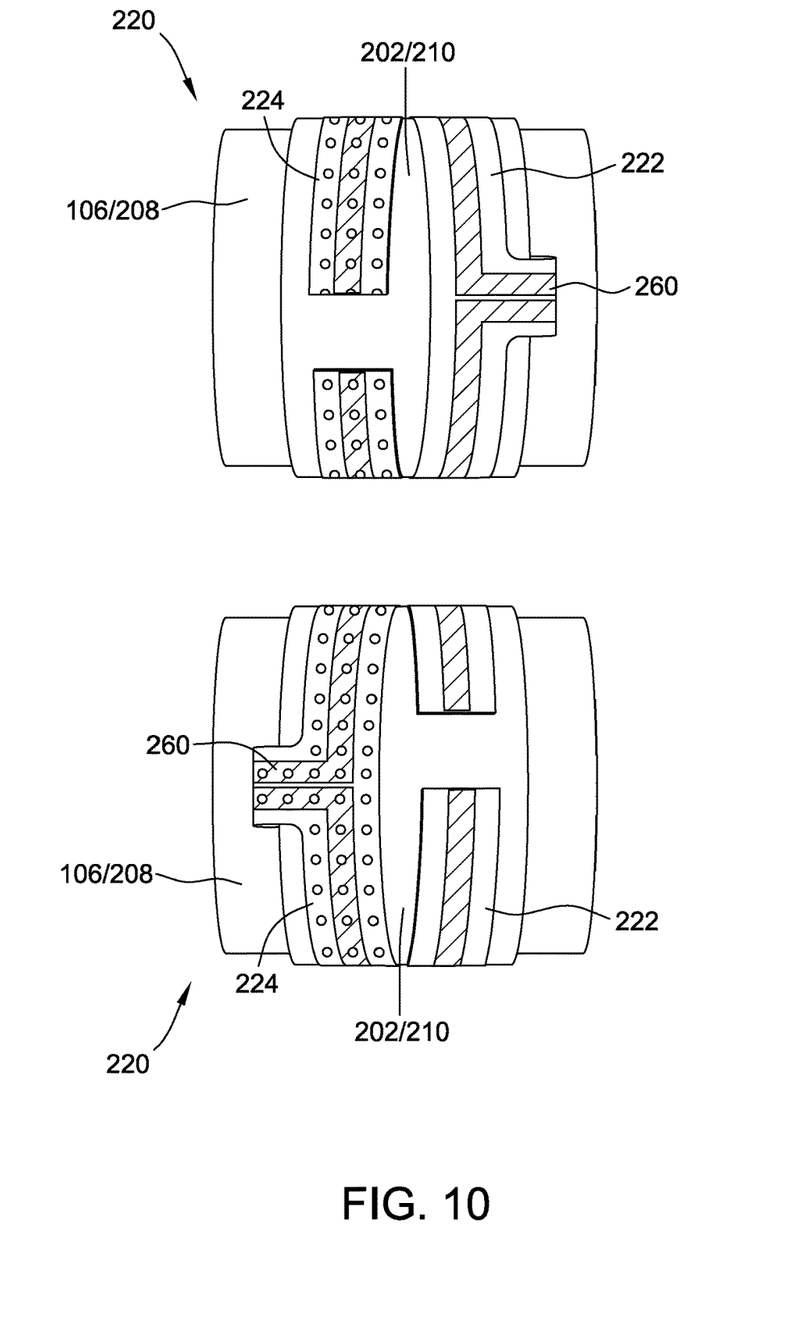
FIG. 10 is a schematic view of the pair of flexible antenna bands shown in FIGS. 7, 8, and 9 at least partially coupled to the retaining rings shown in FIG. 8.

FIG. 8 is a schematic view of first flexible antenna band 222 and second flexible antenna band 224 prior to coupling to retaining ring 202. FIG. 9 is a schematic view of first flexible antenna band 222 and second flexible antenna band 224 prior to coupling to retaining ring 202 with reference to rotor shaft 106. FIG. 10 is a schematic view of first flexible antenna band 222 and second flexible antenna band 224 at least partially coupled to retaining ring 202. In the exemplary embodiment, RF sensor die 256 of band 222 is inserted into cavity 206 (shown in FIGS. 2 and 3) to contact rotor shaft 106 within a contact region 276. Similarly, RF sensor die 256 of band 224 is inserted into cavity 206 to contact rotor shaft 106 within a contact region (not shown) similar to contact region 276 and positioned 180° circumferentially along surface 208. In the exemplary embodiment, RF sensor die 256 of band 222 is coupled to contact region 276 with a robust adhesive configured to withstand temperatures and rotor shaft 106 speeds associated with the intended uses of rotor assembly 104. Alternatively, any method of coupling RF sensor die 256 of band 222 to contact region 276 is used, including, without limitation, brazing.

Figure 11:
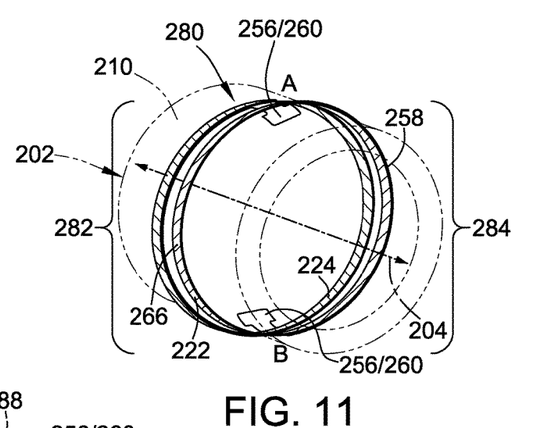
FIG. 11 is a schematic view of the pair of flexible antenna bands shown in FIGS. 7 through 10 in an exemplary overlapping configuration.

FIG. 11 is a schematic view of first flexible antenna band 222 and second flexible antenna band 224 in an exemplary overlapping configuration 280. In the exemplary embodiment, between A and B, first arm 258 of band 222 overlaps second arm 266 for approximately 180° to define an overlap region 282 for band 222. Similarly, second flexible antenna band 224 defines an overlap region 284 between A and B opposite overlap region 282 for band 222. Alternatively, any amount of overlap of arms 258 and 266 that enables operation of RF coupled 220 and monitoring system 200 as described herein is used. Overlapping of bands 222 and 224 as described herein facilitate inducing a self-capacitive effect within each band 222 and 224 that further facilitates enhancing the RF coupling quality between RF coupler 220 and reader-antenna 240 (shown in FIGS. 2 and 3). As such, the overlapping of bands 222 and 224 facilitates decreasing the variability of the signal quality during high-speed operation.

Figure 12:
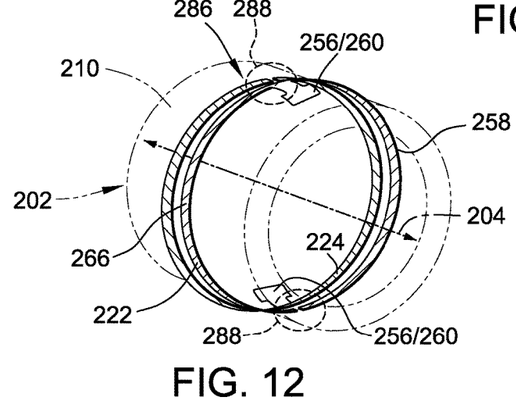
FIG. 12 is a schematic view of the pair of flexible antenna bands shown in FIGS. 7 through 10 in an exemplary gapped configuration.

FIG. 12 is a schematic view of first flexible antenna band 222 and second flexible antenna band 224 in an exemplary gapped configuration 286. For band 222, first arm 258 and second arm 266 are fully extended circumferentially over surface 210 of retaining ring 202 to define a gapped region 288 between arms 258 and 266 opposite RF sensor die 256 and connector 260. Second flexible antenna band 224 is configured similarly. Defining gapped region 288 facilitates accelerating assembly of RF coupled 220.

Figure 13:
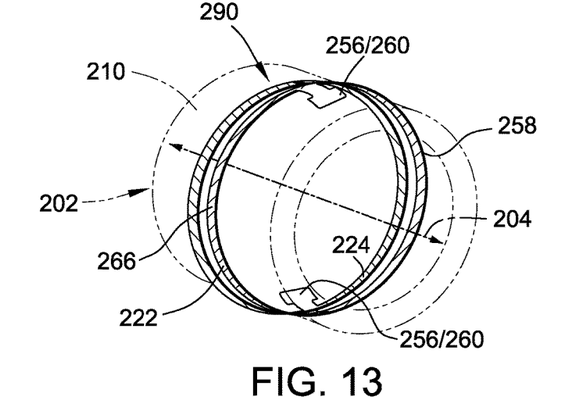
FIG. 13 is a schematic view of the pair of flexible antenna bands shown in FIGS. 7 through 10 in an exemplary full ring configuration.

FIG. 13 is a schematic view of first flexible antenna band 222 and second flexible antenna band 224 in an exemplary full ring configuration 290. For band 222, first arm 258 and second arm 266 are fully extended circumferentially over surface 210 of retaining ring 202 such that arms 258 and 266 touch at a point approximately circumferentially opposite RF sensor die 256 and connector 260. Second flexible antenna band 224 is configured similarly.

Referring to FIGS. 2, 3, 5, and 6, in operation of helicopter 100 and monitoring system 200, reader-antenna 240 generates an electromagnetic field (not shown) proximate RF coupler 220 in a predetermined portion of the RF spectrum, thereby illuminating first flexible antenna band 222 and second flexible antenna band 224 with the electromagnetic field. Specifically, reader-antenna 240 is commanded to energize and operate as a radiating antenna such that antenna bands 222 and 224 operate as receiving antennas. First flexible antenna band 222 and second flexible antenna band 224 are redundant bands to mitigate any potential for interrupting operation of helicopter 100 in the event of a malfunction of one of bands 222 and 224. Each of first flexible antenna band 222 and second flexible antenna band 224 receives sufficient energy to power RF sensor dies 256. RF sensor dies 256 touch rotor shaft 106 and die 256 senses the characteristics of interest associated with rotor shaft 106 that is rotating at high radial velocities, e.g., and without limitation, in excess of 25,000 rpm. RF sensor dies 256 facilitate sensing the change in the characteristics of interest and a measurement signal is generated by dies 256 and transmitted to antenna bands 222 and 224 to generate electromagnetic fields (not shown) that are reflected back to reader-antenna 240. Reader-antenna 240 receives the reflected signals and generates voltage and current signals representative of the regulated electromagnetic field that are transmitted to a processing device that includes sufficient algorithms and instructions programmed therein to generate signals representative of values of the at least one measurement characteristic and transmit the signals representative of values of the at least one measurement characteristic to at least one of a recording device and an indicating device.

The above-described passive sensors, the associated RF coupler, and the associated sensing and monitoring systems described herein facilitate extended operation in harsh environments. Specifically, the radio frequency (RF) coupler as described herein uses two flex antennas that extend about an outer circumference of at least a portion of a retaining ring that extends about a rotor shaft within a helicopter rotor assembly. Each flex antenna includes two arms extending in opposite directions, each from a common stationary surface acoustic wave (SAW) die coupled to both arms. The arms of each flex antenna are not electrically coupled, thereby facilitating ease of assembly of the rotor assembly. The two stationary SAW dies are positioned circumferentially 180° from each other proximate the rotor shaft within an annular region defined between a radially outer portion of the rotor shaft and a radially inner portion of the retaining ring. The SAW devices are configured to measure torque and strain on the rotor shaft. The use of two flex antennas and two SAW dies facilitates redundancy in the harsh conditions created by the high-rotational velocities of the rotor shaft. In one embodiment, one of the arms extends over the other arm approximately half a lap, thereby facilitating a self-capacitive effect that increases the RF signal transmitted from the RF coupler to a reader-antenna device. Moreover, the overlapping configuration of the two arms does not require a ground plane or a terminating resistor, as neither does any of the configurations described herein. Therefore, the materials associated with ground planes are eliminated from the assembly. Such use of flex antennas facilitates ease and speed of manufacturing of helicopter rotor assemblies. The use of adhesives to couple the flex antennas to the rotor ring facilitates the RF coupler surviving the high-G forces induced on the rotor shaft through high-speed velocities of the rotor shaft, sometimes as high as, or greater than 25,000 revolutions per minute (rpm) while maintaining a satisfactory RF coupling quality between the RF coupler and the reader-antenna device, including during high-speed operation. Moreover, the configurations of the RF couplers as described herein facilitate reducing the mechanical instability of the RF coupler by effectively securing the RF coupler die.

An exemplary technical effect of the methods, systems, and apparatus described herein includes at least one of: (a) assembling sensing and monitoring system components associated with rotatable components during the manufacture of such rotatable components using less materials and easier to assemble components, thereby reducing the amount of time and resources expended in preparing the rotatable components for insertion into the respective machines after they are manufactured; (b) using portions of flex antennas to attain a self-capacitive effect, thereby increasing the RF quality between the RF coupler and the reader-antenna device, and as such, decreasing the variability of the signal quality during high-speed operation; (c) facilitating placement of the sensor components at the most appropriate and desired positions within the associated rotor assemblies; (d) positioning sensors in harsh environments that do not have delicate chip features, thereby facilitating more robust sensing devices; (e) using two flex antennas and two rotor die to increase redundancy in the harsh conditions created by the high-rotational velocities of the rotor shaft; (f) eliminating ground planes and terminating resistors from the assemblies, thereby further decreasing assembly time, materials, and costs; and (g) reducing the mechanical instability of the RF coupler by effective securing the RF coupler.

Exemplary embodiments of methods, systems, and apparatus for operating rotary machines are not limited to the specific embodiments described herein, but rather, components of systems and/or steps of the methods may be utilized independently and separately from other components and/or steps described herein. For example, the methods, systems, and apparatus may also be used in combination with other systems requiring a monitoring of components in harsh environments, and the associated methods, and are not limited to practice with only the systems and methods as described herein. Rather, the exemplary embodiment can be implemented and utilized in connection with many other applications, equipment, and systems that may benefit from using passive wireless sensors with the RF coupling features described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for a rotary machine, the rotary machine including a rotatable shaft and a retaining ring coupled to, and at least partially extending about the rotatable shaft, the rotatable shaft defining a longitudinal axis extending therethrough, the rotatable shaft and the retaining ring defining a substantially annular cavity therebetween, the rotatable shaft including a radially outer surface, the retaining ring including a radially outer surface, said monitoring system comprising:
   a stationary reader-antenna positioned proximate the retaining ring;
   a radio frequency (RF) coupler comprising:
      at least one flexible antenna band coupled to, and extending over, the radially outer surface of the retaining ring, said at least one flexible antenna band configured to establish RF coupling with said stationary reader-antenna; and
      at least one sensor die coupled to said at least one flexible antenna band, said at least one sensor die at least partially extending into the substantially annular cavity, said at least one sensor die also coupled to the radially outer surface of the rotatable shaft;
   wherein said at least one flexible antenna band comprising:
   a first arm coupled to and extending from said at least one sensor die in a clockwise direction with respect to the longitudinal axis, said first arm comprising:
      a first portion of a flexible laminate; and
      a first flexible voltage-inducing conductor substantially embedded within said first portion of said flexible laminate, said first flexible voltage-inducing conductor coupled to and extending from said at least one sensor die in the clockwise direction with respect to the longitudinal axis; and
   a second arm coupled to and extending from said at least one sensor die in a counterclockwise direction with respect to the longitudinal axis, said second arm comprising:
      a second portion of said flexible laminate; and
      a second flexible voltage-inducing conductor substantially embedded within said second portion of said flexible laminate, said second flexible voltage-inducing conductor coupled to and extending from said at least one sensor die in the counterclockwise direction with respect to the longitudinal axis.

2. The monitoring system in accordance with claim 1, the radially outer surface of the retaining ring having a circumference thereon, wherein said first arm when fully extended along the outer surface of the retaining ring and said second arm when fully extended along the outer surface of the retaining ring define one of:
   a gap between said first arm said second arm;
   a substantially complete extension about the circumference; and
   said first arm at least partially overlaps said second arm, thereby facilitating a self-capacitive effect.

3. The monitoring system in accordance with claim 1, wherein said retaining ring includes a first longitudinal end and a second longitudinal end opposite the first longitudinal end, wherein said at least one flexible antenna band comprises two flexible antenna bands comprising a first flexible antenna band proximate the first longitudinal end and a second flexible antenna band proximate the second longitudinal end.

4. The monitoring system in accordance with claim 3, wherein said first flexible antenna band comprises a first sensor die, and said second flexible antenna band comprises a second sensor die circumferentially positioned approximately 180° from said first sensor die within the substantially annular cavity.

5. The monitoring system in accordance with claim 1 further comprising one of a heat shrink material, a bimetallic ring, and a fiber glass thread wrapping coupled to and extending over at least a portion of said at least one flexible antenna band and the radially outer surface of the retaining ring.

6. The monitoring system in accordance with claim 1, wherein said at least one sensor die is coupled to the radially outer surface of the rotatable shaft through an adhesive.

7. A rotary machine comprising:
a rotatable shaft comprising a radially outer surface;
a retaining ring coupled to, and at least partially extending about, said rotatable shaft, said rotatable shaft defining a longitudinal axis extending therethrough, said rotatable shaft and said retaining ring defining a substantially annular cavity therebetween, said retaining ring including a radially outer surface; and
a monitoring system comprising:
 a stationary reader-antenna positioned proximate said retaining ring;
 a radio frequency (RF) coupler comprising:
  at least one flexible antenna band coupled to, and extending over, said radially outer surface of said retaining ring, said at least one flexible antenna band configured to establish RF coupling with said stationary reader-antenna; and
  at least one sensor die coupled to said at least one flexible antenna band, said at least one sensor die at least partially extending into said substantially annular cavity, said at least one sensor die also coupled to said radially outer surface of said rotatable shaft; and
wherein said retaining ring includes a first longitudinal end and a second longitudinal end opposite said first longitudinal end, wherein said at least one flexible antenna band comprises two flexible antenna bands comprising a first flexible antenna band proximate said first longitudinal end and a second flexible antenna band proximate said second longitudinal end.

8. The rotary machine in accordance with claim 7, said at least one flexible antenna band comprising:

a first arm coupled to and extending from said at least one sensor die in a clockwise direction with respect to the longitudinal axis, said first arm comprising:
 a first portion of a flexible laminate; and
 a first flexible voltage-inducing conductor substantially embedded within said first portion of said flexible laminate, said first flexible voltage-inducing conductor coupled to and extending from said at least one sensor die in the clockwise direction with respect to the longitudinal axis; and
a second arm coupled to and extending from said at least one sensor die in a counterclockwise direction with respect to the longitudinal axis, said second arm comprising:
 a second portion of said flexible laminate; and
 a second flexible voltage-inducing conductor substantially embedded within said second portion of said flexible laminate, said second flexible voltage-inducing conductor coupled to and extending from said at least one sensor die in the counterclockwise direction with respect to the longitudinal axis.

9. The rotary machine in accordance with claim 8, the radially outer surface of said retaining ring having a circumference thereon, wherein said first arm when fully extended along the outer surface of said retaining ring and said second arm when fully extended along the outer surface of said retaining ring define one of:
 a gap between said first arm said second arm;
 a substantially complete extension about the circumference; and
 said first arm at least partially overlaps said second arm, thereby facilitating a self-capacitive effect.

10. The rotary machine in accordance with claim 7, wherein said first flexible antenna band comprises a first sensor die, and said second flexible antenna band comprises a second sensor die circumferentially positioned approximately 180° from said first sensor die within said substantially annular cavity.

11. The rotary machine in accordance with claim 7 further comprising one of a heat shrink material, a bimetallic ring, and a fiber glass thread wrapping coupled to and extending over at least a portion of said at least one flexible antenna band and the radially outer surface of said retaining ring.

12. The rotary machine in accordance with claim 7, wherein said at least one sensor die is coupled to said radially outer surface of said rotatable shaft through an adhesive.

* * * * *